United States Patent [19]

Bernhard

[11] 3,896,853

[45] July 29, 1975

[54] COUPLING MEANS FOR USE WITH BLOOD SAMPLING APPARATUS

[75] Inventor: Johann Bernhard, Nacka, Sweden

[73] Assignee: Pro Medical Engineering AB, Lidingo, Sweden

[22] Filed: July 23, 1974

[21] Appl. No.: 490,982

Related U.S. Application Data

[62] Division of Ser. No. 270,312, July 10, 1972, Pat. No. 3,838,843.

[52] U.S. Cl. ........ 137/614.05; 128/2 F; 128/DIG. 5; 128/218 NV; 128/274; 251/149.5; 285/14
[51] Int. Cl. ........................ F16l 37/28; A61b 5/14
[58] Field of Search ........ 128/2 F, DIG. 5, 218 NV, 128/274, 214 R; 285/13, 14; 251/149.1, 149.5; 137/614.05

[56] References Cited
UNITED STATES PATENTS

| | | |
|---|---|---|
| 2,727,761 | 12/1955 | Elliott et al. ..................... 285/14 X |
| 3,159,159 | 12/1969 | Cohen ................................. 128/2 F |
| 3,191,905 | 6/1965 | Brown .............................. 251/149.5 |
| 3,459,177 | 8/1969 | Deuschle ............................ 128/2 F |
| 3,460,529 | 8/1969 | Leucci ................................ 128/2 F |
| 3,500,821 | 3/1970 | Ogle .................................. 128/2 F |
| 3,583,667 | 6/1971 | Amneus ........................... 251/149.5 |
| 3,659,587 | 5/1972 | Baldwin ............................. 128/2 F |

FOREIGN PATENTS OR APPLICATIONS

| | | |
|---|---|---|
| 70,496 | 12/1958 | France .................................. 285/14 |
| 164,959 | 1/1950 | Austria ................................. 285/14 |

*Primary Examiner*—Kyle L. Howell
*Attorney, Agent, or Firm*—Silverman & Cass, Ltd.

[57] ABSTRACT

A coupling device for use with blood sampling apparatus including two portions adapted to be assembled to form a vacuum-tight seal one with the other. The said portions having mating parts formed with an apertured duct which prevent compression of air between the portions until the same are engaged in tight assembly.

7 Claims, 8 Drawing Figures

PATENTED JUL 29 1975　　　　　　　　　　　　　　3,896,853

3,896,853

COUPLING MEANS FOR USE WITH BLOOD SAMPLING APPARATUS

BACKGROUND OF THE INVENTION

This is a divisional application of my copending patent application, U.S. Ser. No. 270,312, filed July 10, 1972, entitled COUPLING MEANS FOR USE WITH BLOOD SAMPLING APPARATUS, now U.S. Pat. No. 3,838,843.

This invention relates to devices for taking blood samples which consist of two parts provided with ducts, one of which is fitted with a needle or cannula and the other can be connected to an evacuated test tube or some other vessel for the collection of blood, which parts can be fitted together and taken apart, which operations should be performed as easily and smoothly as possible and without any perceptible compression of air in either of the parts during the assembly operation, despite the fact that the ducts in the parts are hermetically sealed.

The said compression of air is prevented according to the invention by means of measures to ensure that the air displaced during the assembly operation is able to pass out into the open without being compressed. According to the invention, this can be achieved by providing the parts to be joined with male and female tapers, so that the air displaced by the tapers while these are being joined together can leave through the gap between the tapers before contact is established between these. The small longitudinal displacement and rise in pressure during the very last stage of displacement of the tapers prior to their contact is so small that it constitutes no danger. However, the tapers must be pressed against one another comparatively hard in order that vacuum-tight contact should be attained, and both assembly and withdrawal of the parts require considerable force. It is, therefore, the aim of the invention to prevent this compression of air even without the use of male and female tapers but by constructing the parts which are to form the vacuum-tight seal with one another in such a way that these can be joined together and taken apart smoothly with the least possible force, and at the same time ensure that a vacuum-tight seal is formed and there is no perceptible compression of air.

SUMMARY OF THE INVENTION

A coupling device for use with blood sampling apparatus comprising a needle carrier portion, including valve means surrounded by a resilient valve sleeve and a junction portion including a junction sleeve which is removably coupled to the valve means, wherein in connecting the two portions the junction sleeve lifts part of the resilient sleeve to enable escape of air to the atmosphere.

DESCRIPTION OF THE PREFERRED EMBODIMENTS

Figure 1:
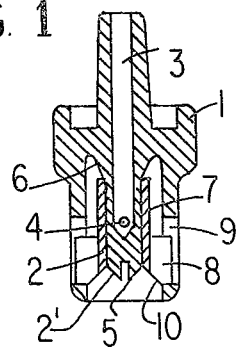
FIGS. 1 and 2 show longitudinal sections through two parts constructed according to the invention which are to be connected together.
Figure 7:
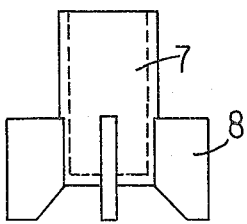
FIG. 7 shows an enlarged frontal view of the resilient valve sleeve.

According to FIG. 1, a needle carrier part 1 which is shown without a needle or cannula is provided with a cylindrical valve unit 2 with a duct 3 and a vent hole 4 at the inner closed end of the duct 3. The outer end 2' of the valve unit 2 is tapered or rounded and has a transverse slot 5. The base portion 6 of the valve unit 2 adjacent to the needle carrier part 1 is tapered. An airtight seal is provided around the valve unit by a resilient valve sleeve 7 surrounding the valve unit which can be pulled onto the valve unit 2 a limited distance axially and in such a way that it cannot turn around, by virtue of the fact that the valve sleeve 7 is provided with radial guide fins 8 which can be pushed some way into the grooves 9 in the needle carrier part 1. The outer end of the valve sleeve 7 has a tapered recess 10 with its narrow end towards the valve unit. It is best if both the needle carrier part 1 and the valve sleeve 7 are made from a transparent, preferably plastic, material, whereby it is best if the sleeve 7 is resilient so as to permit its adhesion onto the valve unit and also its expansion while being pushed up onto the tapered base portion 6.

Figure 2:
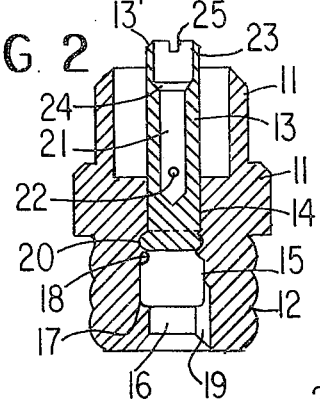

FIG. 2 shows a junction piece 11 with a safety collar 11' and with a part 12 provided with sealing beads which are intended to be inserted, in such a way as to provide an airtight seal, into an evacuated test tube which is not shown here. Through the junction piece 11 runs a central duct formed by a duct portion 14 fitting tightly around a junction sleeve 13, a circular duct portion 15 around the sleeve 13 and an end opening portion 16. At its junction with the portion 16, the circular duct 15 has a shoulder 17 and, further inside the part 15, there are projections 18. There is a by-pass groove 19 between parts 15 and 16 of the duct. The junction sleeve 13 has an end bead 20 which abuts either onto the shoulder 17 or onto the projections 18, and the length of the sleeve 13 is such that it projects some distance beyond the tightly fitting portion 14 and has its chamfered end 13' level with the outer end of the collar 11' when the end bead 20 abuts onto the shoulder 17. The junction sleeve 13 is further provided with a duct 21 open only at one end, which duct has one or more lateral holes 22 through its walls in such a position that the hole or holes are open, as shown in FIG. 2, when the end bead 20 abuts onto the top of the projections 18 but are closed by the circular duct portion 14 when the end bead 20 abuts onto the underside of the projections 18. The orifice portion 23 of the duct 21 is somewhat wider than the valve unit 2 and is terminated on the inside by a stop surface 24. There are one or more grooves 25 in the outer portion or edge of the orifice portion 23.

Use and assembly of the device in accordance with the invention will be described in conjunction with FIGS. 1–3. The needle carrier part 1 is fitted with a needle which is inserted into the vein of a patient, whereupon blood can flow through the duct 3 to the vent hole 4. It is assumed that the junction piece 11 is inserted into an evacuated test tube with the junction sleeve 13 in the projecting position abutting onto the projections 18 according to FIG. 2 and with the lateral hole 22 open outside the portion 14. The junction piece 11 is moved axially towards the needle carrier part 1, the junction sleeve 13 being guided by the tapered recess 10 towards the outer end of the valve unit 2 and brought against the valve sleeve 7. Continued assembly of the needle carrier part 1 and the junction piece 11 takes place in two stages.

Assembly Stage I

During continued pressing together of the junction piece 11 and the needle carrier part 1, the vent hole 4 is kept covered by the valve sleeve 7 while the valve sleeve 7 is pushed inwards and slides up onto the tapered portion 6 and forms an airtight seal along this during continued deformation of the sleeve, until the guide fins 8 reach the end position in the grooves 9. The air compressed during this stage is exhausted through the grooves 25. During continued movement of the junction piece in the direction of the needle carrier part 1 the junction sleeve 13, with the aid of its chamfered end 13' and the taper 10 of the valve sleeve, pushes in underneath the valve sleeve 7 which expands, whereby the junction sleeve 13 undergoes a further minimal displacement and its stop surface 24 abuts onto the end surface 2' of the valve unit 2, and at the same time the valve sleeve 7, owing to its pretension, slides a longer distance onto the junction sleeve 13 than the longitudinal displacement referred to last, and the air grooves 25 which up to now permitted the flow of air in order to prevent compression of the air are covered over and a minimal tendency towards a rise in pressure which may arise is compensated for by the space below the expanded valve sleeve. The projections 18 are sufficiently resistant to give sufficient support to the bead 20 during entry of the junction sleeve 13 and displacement of the valve sleeve 7.

During the said assembly operation and entry of the valve unit 2 into the junction sleeve 13 which occurs until the end surface 2' of the valve unit comes into contact with the stop surface 24 of the junction sleeve, air is displaced and passes into the open through the clearance in the orifice portion 23 and through the groove or grooves 25 until the said grooves become covered by the valve sleeve 7. In addition, however, as a further safety factor, after the said assembly and closure, the whole duct system from the point of the needle, by way of the duct 3, lateral hole 4, the clearance between the valve unit 2 and the expanded portion 23 of the junction sleeve 13', as well as past the contact surface 24, is open to the lateral hole 22 in the junction sleeve 13 which is situated outside the sealed area. At this stage of the assembly process, blood can flow through the duct described and out through the lateral hole 22. The following is achieved by means of this device:

a. There is a further safety factor against air being forced into the patient's vein.
b. Blood will be visible in the hole 22 surrounded by the safety collar 11' if one waits long enough after the first stage of assembly. Blood can also be seen in the space between the taper of the needle and the expanded engagement portion of the needle carrier part 1.

Assembly Stage II

When the pressure in the direction of assembly towards the junction sleeve 13 rises, the projections 18 can no longer provide sufficient resistance but are displaced past the bead 20 which thereafter passes towards the shoulder 17, whereby the lateral hole 22 is opened towards the circular duct 15. After this, due to the effect of the vacuum in the test tube, blood can pass from the duct 3 through the vent hole 4, through the valve sleeve 7 which is lifted off the sealing surface at this point, through the clearance in the orifice portion 23, through the duct 5 and past the shoulder 24, through the duct 21, the lateral hole 22 and duct portions 15, 19 and 16 to the test tube.

When the desired quantity of blood has been taken, the junction piece 11 is withdrawn from the needle carrier part 1, during which operation the friction between the stretched valve sleeve 7 and the junction sleeve 13 is sufficient to pull the junction sleeve outwards until the bead 20 is stopped by the projections 18, whereby the hole 22 has been closed by the tightly fitting portion 14 and the end surface 13' of the junction sleeve is situated level with, or somewhat below, the outer edge of the safety collar 11'. During continued withdrawal, the junction sleeve 13 is disengaged from the valve sleeve 7 which consequently again seals off the vent hole 4. The test tube and the needle carrier part are thus separated and are each sealed off. After this, if so desired, another evacuated test tube may be connected to the needle carrier part in order to take further blood.

Figure 3:
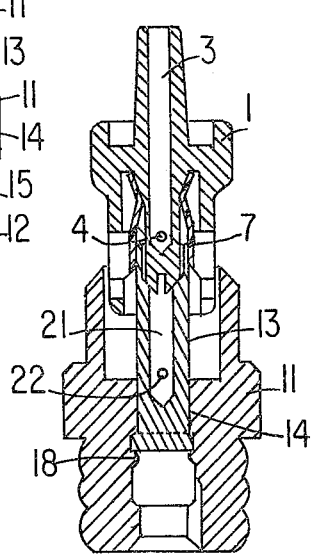
FIG. 3 shows a longitudinal section of the parts assembled in a first stage.
Figure 4:
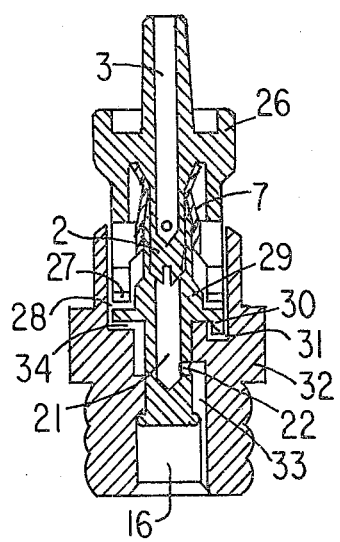
FIG. 4 shows a longitudinal section through two parts of modified construction when assembled.
Figure 8:
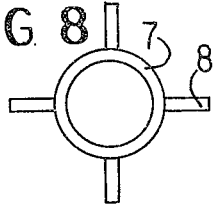
FIG. 8 shows an enlarged plan view of the resilient valve sleeve.

According to the constructional version shown in FIG. 4, assembly of the needle carrier part and the junction piece takes place by means of displacement and twisting. Those parts in FIG. 4 which, as to their construction, fully correspond to those in FIGS. 1–3 have been given the same identification numbers as those in the Figures referred to. The needle carrier part 26 and its associated components have the same construction as in FIG. 1 but with the addition that part 26 has devices such as teeth, ribs or grooves 27 which engage with mating devices 28 in the junction sleeve 29 which cannot be displaced axially but, by means of a stop 30 in the groove 31, can be twisted through a limited angle in the junction piece 32. With the stop 30 at one of its end positions in the groove 31 the hole 22 is open to the duct 33 and at its other end position it is open to an air duct 34, but in intermediate positions the hole 22 is closed by the junction piece, as when the junction piece is inserted into an evacuated test tube.

In order to connect a test tube to the needle carrier part by means of the junction piece 32, the junction sleeve 29 is pushed over the valve unit 2 and into the valve sleeve 7, air being forced out, without being compressed as explained in conjunction with the description of FIGS. 1–3, and through the hole 22 and duct 34. After this the junction piece and the needle carrier part are twisted in relation to one another and thereby also the junction sleeve 29 relative to the junction piece by virtue of the devices 27, 28 being in engagement, so that hole 22 is opened to the duct 33 and blood can be taken.

Figure 5:
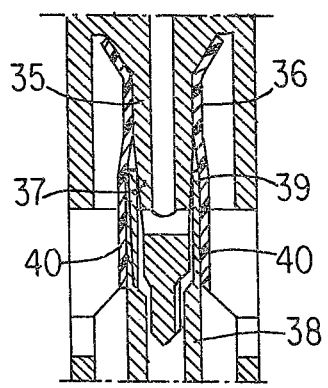
FIG. 5 shows a longitudinal section through a portion of two further modified parts when assembled.

According to the constructional version shown in FIG. 5, the valve unit 35 is surrounded by a resilient valve sleeve 36 and is tapered along its entire length or over the portion 37. The orifice portion 39 of the junction sleeve 38 is tapered in order to fit over the tapered portion 37. On the outside face of the outer end of the junction sleeve there are axial air ducts 40. During assembly the displaced air passes between the tapered parts 37,39 and is driven out through the ducts 40 until the tapered parts 37,39 are in contact.

Figure 6:
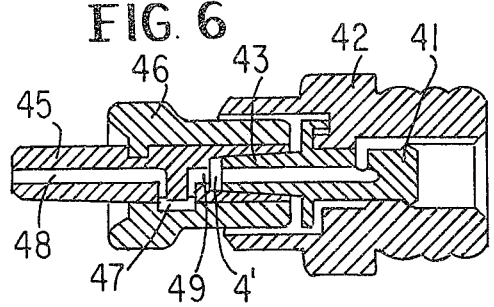
FIG. 6 shows a longitudinal section through two modified parts according to the invention when assembled.

FIG. 6 shows a constructional version which, like that in FIG. 4, has a junction sleeve 41 which cannot be moved axially but can be twisted a limited amount in the junction piece 42, but the outer end 43 of the junction sleeve is tapered in order to fit into a tapered recess 44 in the valve unit 45, on which a resilient sleeve 46, which is provided with grooves 47 that, depending on the relative positions of the parts 45,46, can put the duct 48 of the valve unit and a vent hole 49 in and out of communication, can be twisted through a limited angle. In this constructional version also, displaced air can leave between the tapered parts 43,44 until these come into contact and displacement of air ceases. The components whose angle of twist is limited can be constructed in such a way that, when the junction piece 41 and the sleeve 46 are twisted in opposite directions and until twisting is stopped, the duct portions are open to the flow of blood, while when these parts are twisted in the other direction right up to the stop, the ducts in the valve unit 45 and the junction piece 41 are closed.

After this it will be evident that assembly of the needle carrier part and the junction piece, and opening of the duct connecting them, takes place in two stages, a first and second displacement stage in the device according to FIGS. 1–3 and a first displacement stage and a twisting stage in the devices according to FIGS. 4–6.

The device in accordance with the invention has the advantage that it permits assembly of the needle carrier part and the junction piece practically without any compression of air in the closed ducts which are connected to one another, and that opening of the vent hole 4 takes place by virtue of the fact that a body, the junction sleeve, is forced in between the valve unit and the resilient valve sleeve and lifts the valve sleeve off the sealing surface of the valve unit around the vent hole, after which, as soon as the said body has been withdrawn, the resilient valve sleeve itself closes the vent hole, and that the resilient valve sleeve, in spite of the fact that it is expanded by the said body, maintains a seal against the base portion of the valve unit by being forced up onto the taper 6 there, and also that the device permits drip-proof connection to the test tube, owing, in particular, to the presence of the safety collar 11'. Manipulation of the device is easy and connection and removal of the test tube when taking a blood sample can be carried out quickly and, from the point of view of the patient, gently.

The construction according to the invention can naturally be varied within the scope of the invention. For instance, any combinations of the taper — push connection, twist-push connection arrangements in the Figures shown are possible within the scope of the invention and will accomplish assembly of the needle carrier part and the junction piece without compression of air. The resilient valve sleeve may possibly be situated in the shape of a plug inside a tubular valve unit with vent holes through its wall, from which holes the valve sleeve may be displaced by a tube portion entering the valve unit. The guide fins may be replaced by flanges, grooves, projections, ribs, etc. The duct 5 which permits flow of blood past the stop surface 24 may be replaced by one or more grooves through the stop surface.

What it is claimed and desired to secure by Letters Patent of the United States is:

1. A coupling device for use with blood sampling apparatus comprising a needle carrier portion, a junction portion, and means for fitting said portions to one another into an operative unit, said needle carrier portion comprising:
   a. valve means having an axial duct and a vent hole,
   b. a resilient valve sleeve surrounding said valve means, and including means for sealing said vent hole, said junction portion having an axial bore open at the lower end thereof, and comprising:
   1. a junction sleeve disposed in said bore, means for turning the junction sleeve in the bore of the junction portion to a first position, said junction sleeve having an axial duct and a lateral hole,
   2. means associated with the needle carrier portion and the junction sleeve for fitting one to another, said last means enabling the turning of the needle carrier portion and the junction sleeve as one unit relative to the junction portion for closing said lateral hole,
   3. said junction sleeve having an orifice portion at the upper end of said axial duct,
   4. said orifice portion being slightly wider than said valve means, and
   5. said junction sleeve being removably coupled to said valve means, whereby in connecting the two portions of the device no air is forced into the first portion by reason of the junction sleeve lifting part of the resilient valve sleeve thereby opening the vent hole to enable escape of air to the atmosphere.

2. The device as set forth in claim 1 in which the junction sleeve comprises a plurality of stops, and the junction portion comprises a plurality of grooves, said stops and grooves constructed to engage one another such as to allow the turning of the junction sleeve in the junction portion by a predetermined degree.

3. The device as set forth in claim 1 in which the means for turning the needle carrier portion and the junction sleeve as one unit includes a plurality of teeth at the needle carrier portion and a plurality of matching teeth at the junction sleeve.

4. The device as set forth in claim 1 in which the junction portion comprises a second duct open to the open lower end of said bore, and the means for turning the junction sleeve in the bore of the junction portion includes a second position for opening said lateral hole to said second duct.

5. The device as set forth in claim 4 in which the junction portion comprises a third duct and the means for turning the junction sleeve in the bore of the junction portion includes a third position for connecting said lateral hole to the said third duct.

6. The device as set forth in claim 1 in which the valve means comprises a tapered part at the lower end thereof, and the junction sleeve comprises a tapered part at the upper end thereof, said tapered parts constructed to matingly engage one another.

7. The device as set forth in claim 6 in which the valve means comprises a fourth duct, said last duct extending in longitudinal direction and structured such as to place the ducts in the valve means in and out of communication with the ducts in the junction sleeve.

* * * * *